United States Patent
Takatori et al.

[11] Patent Number: 5,815,489
[45] Date of Patent: Sep. 29, 1998

[54] SELF-HEALING RING SWITCH AND METHOD OF CONTROLLING THE SAME

[75] Inventors: Masahiro Takatori, Hachioji; Yoshihiro Ashi; Hiroyuki Fujita, both of Yokohama, all of Japan

[73] Assignee: Hitachi, Ltd., Tokyo, Japan

[21] Appl. No.: 741,441

[22] Filed: Oct. 31, 1996

Related U.S. Application Data

[63] Continuation of Ser. No. 356,617, Dec. 15, 1994, Pat. No. 5,600,631.

[30] Foreign Application Priority Data

Jan. 11, 1994 [JP] Japan ................................. 6-001112

[51] Int. Cl.$^6$ .................................................. H04Q 11/04
[52] U.S. Cl. ........................... 370/217; 370/223; 370/372; 370/380; 359/117
[58] Field of Search ..................... 370/216, 217, 370/221, 222, 223, 357, 360, 361, 369, 371, 380, 381, 382, 388, 433, 434, 372; 395/180, 181, 182.01, 182.02; 340/825.03, 826, 827, 825.05; 379/219, 220, 221; 359/115, 117, 118, 119

[56] References Cited

U.S. PATENT DOCUMENTS

| | | | |
|---|---|---|---|
| 4,470,139 | 9/1984 | Munter | 370/363 |
| 4,797,589 | 1/1989 | Collins | 370/370 |
| 4,964,095 | 10/1990 | Tyrrell et al. | 370/221 |
| 5,018,135 | 5/1991 | Ashi et al. | 370/535 |
| 5,179,548 | 1/1993 | Sandesara | 370/222 |
| 5,216,666 | 6/1993 | Stalick | 370/222 |
| 5,311,501 | 5/1994 | Takatsu | 370/357 |
| 5,327,427 | 7/1994 | Sandesara | 370/222 |
| 5,412,652 | 5/1995 | Lu | 370/223 |
| 5,475,676 | 12/1995 | Takatori et al. | 370/222 |

OTHER PUBLICATIONS

Bellcore, Bell Communications Research, Technical Advisory TA–NWT–001230, Issue 2, Apr. 1992: *Sonet Bidirectional Line Switched Ring Equipment Generic Criteria*.

Bellcore, Bell Communications Research Research, Technical Reference TR–TSY–000496 issue 2, Sep. 1989, Supplement 1, Sep. 1991: *Sonet Add–Drop Multiplex Equipment (Sonet ADM) Generic Criteria*.

American Nattional Standards Institute, Inc., American National Standard for Telecommunications, draft standard Sep. 15, 1992: *Synchronous Optical Network (Sonet): Automatic Protection Switching*.

*Primary Examiner*—Alpus H. Hsu
*Attorney, Agent, or Firm*—Kenyon & Kenyon

[57] ABSTRACT

A self-healing ring switch transmission system uses space division switches disposed upstream and downstream of an add drop switch in order to determine a correspondence with a plurality of ring-switch modes by merely changing the software. This is accomplished by having one output highway of the add drop switch and one output highway of a space division switch connected with an input stage of a selector for selecting one time slot of the two output highways.

9 Claims, 14 Drawing Sheets

Prior Art ically to a line 32-1 of FIG. 6A; the
SELF-HEALING RING SWITCH AND METHOD OF CONTROLLING THE SAME This application is a continuation of application Ser. No. 08/356,617, filed Dec. 15, 1994, now U.S. Pat. No. 5,600,631.

BACKGROUND OF THE INVENTION

The present invention relates to a construction of a self-healing transmission system and, more particularly, to a self-healing ring switch and a method of controlling it.

At present, a self-healing network is exemplified by the 2-Fiber Bidirectional Line Switched Ring (i.e., 2-Fiber BLSR), the 4-Fiber Bidirectional Line Switched Ring (i.e., 4-Fiber BLSR) and the Unidirectional Path Switched Ring (i.e., UPSR), as disclosed in "Bellcore Technical Advisory TA-NWT-001230, issue 3".

The 2-Fiber BLSR is a system in which the individual nodes are connected through two lines to divide the channel of each line into two halves—a working half and a protection half (as shown in FIG. 3A). With the ordinary path, the forward and backward communications pass through the same lines (as shown in FIG. 3B). If the lines 30-4 and 31-4 between nodes A–B fail, for example, in the network shown in FIGS. 3A and 3B, the path through the failed section is bypassed (or ring-switched) by using a counter protection channel (as shown in FIG. 4). What ring-switches at this time is the failed end nodes (i.e., the nodes A and B0 in this example). The remaining nodes execute the relaying of the bypass traffic. The node construction is exemplified in FIG. 5. Each node is equipped with not only in-ring inter-node, but also a tributary traffic add line 11 and a drop line 12. In case this construction is applied to the node A of FIG. 3A: a CW-direction working reception line 20 corresponds to the line 30-4 of FIG. 3; a CCW-direction working reception line 22 corresponds-to a line 31-1 of FIG. 3A; a CW-direction working transmission line 24 corresponds to a line 30-1 of FIG. 3; and a CCW-direction working transmission line 26 corresponds to the line 31-4 of FIG. 3A. The ring switch in the 2-Fiber BLSR can be easily realized by the TSI (i.e., Time Slot Interchange) function belonging to a switch 34-1 in the node.

The 4-Fiber BLSR is equipped with working lines and protection lines and connects the individual nodes through four lines. Moreover, the 4-Fiber BLSR normally transmits the working lines but heals the traffic in case a failure occurs by using the protection lines (as shown in FIG. 6A). With the normal path setting, the forward and backward communications pass through the same lines (as shown in FIG. 6B). If, only the working line 30-4 between the nodes A–B fails, for example, in the network shown in FIG. 6A, the path through the failed section is effected by using a protection line 32-4 (as span-switched in FIG. 7A). If both the working line and the protection line between the nodes A–B, fail on the other hand, the path through the failed section is bypassed (or ring-switched) through the counter protection line (as shown in FIG. 7B). What executes the span-switching and the ring-switching is the failure end node (as exemplified by the nodes A and B in the present example). The remaining nodes execute the relaying of the bypass traffic. An example of the node construction is shown in FIG. 8. In case this construction is applied to the node A of FIG. 6A: the CW-direction working reception line 20 corresponds to the line 30-4 of FIG. 6A; a CW-direction protection reception line 21 corresponds to the line 32-4 of FIG. 6A; the CCW-direction working reception line 22 corresponds to the line 31-2 of FIG. 6A; a CC direction protection reception line 23 corresponds to a line 33-1 of FIG. 6A; the CW-direction working transmission line 24 corresponds to the line 30-1 of FIG. 6A; a CW-direction protection transmission line 25 corresponds to a line 32-1 of FIG. 6A; the CCW-direction working transmission line 26 corresponds to the line 31-4 of FIG. 6A; and a CCW-direction protection transmission line 27 corresponds to a line 33-4 of FIG. 6A. Like the 2-Fiber BLSR, each node is equipped with not only the in-ring inter-node connecting lines, but also the tributary traffic add line 11 and the drop line 12.

The UPSR has its nodes connected through two lines—one for working and the other for protection (as shown in FIG. 9A). With the ordinary path setting, therefore, the forward and backward communications pass through different paths (but in the same direction) (as shown in FIG. 9B). In FIG. 9B, the counter clockwise (i.e., CCW) paths are working so that they are normally used for the transmissions. The clockwise (i.e., CW) paths are for protections. The paths are set for both the working and protection operations, and the working paths are selected at the path terminal node. If a failure occurs between the nodes A–B in FIG. 9A, it can be healed by selecting the protection path at the path terminal node (as shown in FIG. 10). The node construction is shown in FIG. 11. In case this construction is applied to the node A of FIG. 9A: the CW-direction protection reception line 21 corresponds to the line 32-4 of FIG. 9A; the CCW-direction working reception line 22 corresponds to the line 31-1 of FIG. 9A; the CW-direction protection transmission line 25 corresponds to the line 32-1 of FIG. 9A; and the CCW-direction working transmission line 26 correspond to the line 31-4 of FIG. 9A. Output highways 15-5 and 15-7 corresponds to the working and protection ones, respectively. The selection of the working and protection is carried out by a selector 2. Each node is equipped with not only the in-ring inter-node connecting lines, but also the tributary traffic line 11, the drop line 12 and the protection ones.

SUMMARY OF THE INVENTION

The construction of the prior art corresponds to each of the various ring-switching modes. In the same system, therefore, the aforementioned plurality of ring-switching modes cannot be realized merely by changing the software.

The present invention contemplates to solve the above-specified defect and has an object to provide a correspondence to the aforementioned plurality of ring-switching modes merely by changing the software.

In order to achieve this object, according to the present invention, space division switches are disposed upstream and downstream of an add drop switch (i.e., time division switch), and one of the output highways of the add drop switch and one of the output highways of the second space division switch are connected with the input stage of a selector for selecting one of the time slots on those two output highways.

A circuit according to the present invention, is constructed to comprise: a self-healing ring switch (i.e., SHRSW) composed of a switch, a selector and a selector controller; and nodes composed of reception interfaces and transmission interfaces. The switch has five inputs and five outputs, and the selector has two inputs and one output. Reception lines and an add line are connected with the input terminals of the switch through the reception interfaces, and output highways are connected with transmission lines through the transmission interfaces. Moreover, the output highway is connected with the input terminal of the selector. If one output highway is dropped, and the branched output highway is connected with the other input terminal of the selector. On the other hand, the reception interfaces are equipped therein with means for detecting a fault of the received signals. Whether or not each received signal fails is transmitted through a signal line to the switch and the selector controller.

First of all, here will be described a method of using this SHRSW in the 2-Fiber BLSR. The ring-switching in the 2-Fiber BLSR can be easily realized by the TSI function of the switch. Moreover, the selector selects the output highway at all times. The 2-Fiber BLSR does not use the other output highway because it requires no protection line.

Here will be described the method of using the SHRSW in the 4-Fiber BLSR. The ring-switching in the 4-Fiber BLSR can be easily realized by the TSI function of the switch. The span-switching can also be easily realized by the switch. In this case, too, the selector selects the output highway at all times. At this time, the other output highway is allocated to the ring protection line.

Here will be described the method of using the SHRSW in the UPSR. In the case of the UPSR, two lines are used for connecting the nodes. As a result, one output highway of the switch is left idle. Of the output highways, therefore, the output highway and the other output highway are used as the drop lines. By the TSI function of the switch, moreover, one of the two drop lines is allocated to the clockwise (CW) path, whereas the other is allocated to the counter clockwise (CCW) path. Alternatively, one is allocated to the working path whereas the other is allocated to the protection path. The selector selects one of the aforementioned two output highways at the unit of path or time slot. If a path being selected is affected, the selection can be switched to select the other path to heal the failure. Specifically, one of the output highways of the switch, which have been allocated to the ring output line for the 4-Fiber BLSR, is assigned to the drop line for the UPSR. Then, the failure can be healed such that the selector selects the normal one of the two drop lines.

In case, moreover, the switch is constructed of three stages of a space division switch—a time division switch—a space division switch, it can be easily coped with by controlling the space division switches even if it is used as a linear switch (for switching 1:1 and 1+1).

As described above, the circuit construction according to the present invention can be applied to any of the switching modes. This makes it possible to realize any switching mode with the same circuit construction merely by interchanging the software.

DETAILED DESCRIPTION

Figure 1:
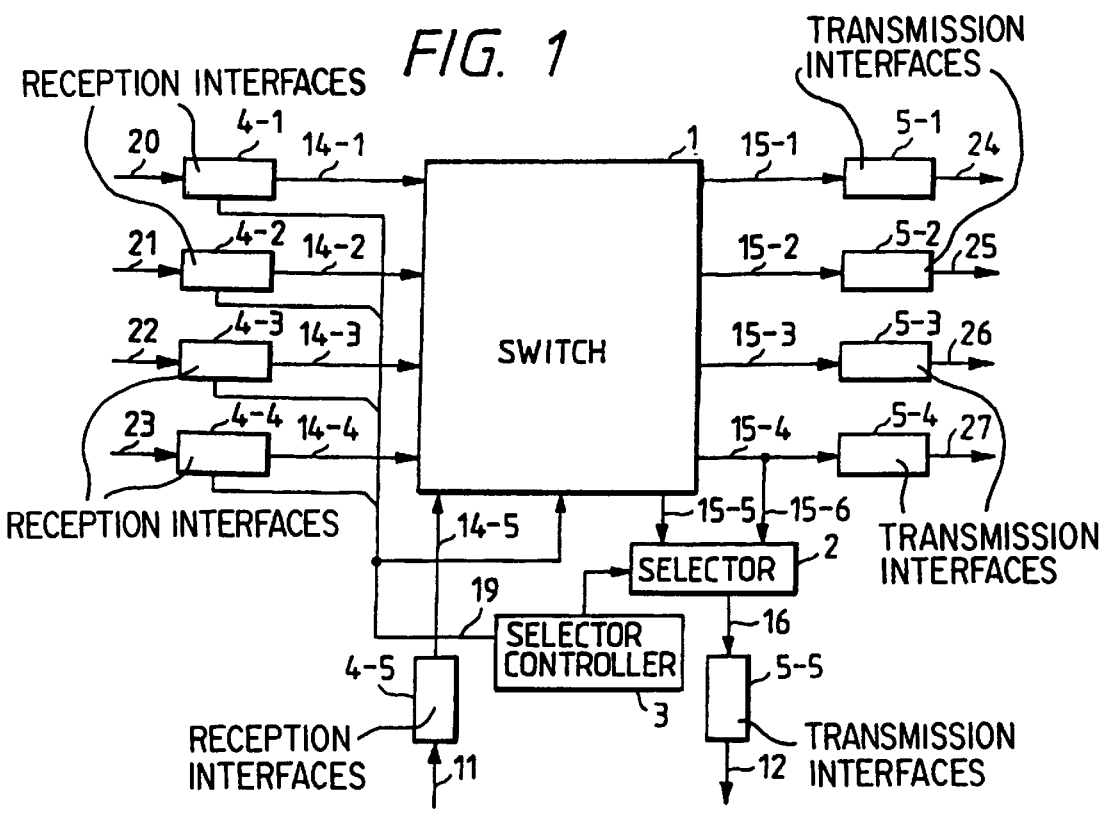
FIG. 1 is a diagram showing a basic construction of a node in the present invention.

A first embodiment of the present invention will be described with reference to FIG. 1. The circuit shown in FIG. 1 is constructed to comprise a self-healing ring switch (i.e., SHRSW) composed of a switch 1, a selector 2 and a selector controller 3. The switch 1 has five inputs and five outputs, and the selector 2 has two inputs and one output. Reception lines 20 to 23 and an add line 11 are connected with the input terminals of the switch 1 through reception interfaces 4-1 to 4-5, and output highways 15-1 to 15-4 are connected with transmission lines 24 to 27 through transmission interfaces 5-1 to 5-4. Moreover, an output highway a15-5 is connected with the input terminal of the selector 2. An output highway b15-4 is dropped, and a branched output highway b'15-6 is connected with the other input terminal of the selector.

On the other hand, the reception interfaces are equipped therein with means (i.e., failure detecting means) for detecting a failure of the received signals. Whether or not each received signal fails is transmitted through a signal line 19 to the switch 1 and the selector controller 3.

Figure 2:
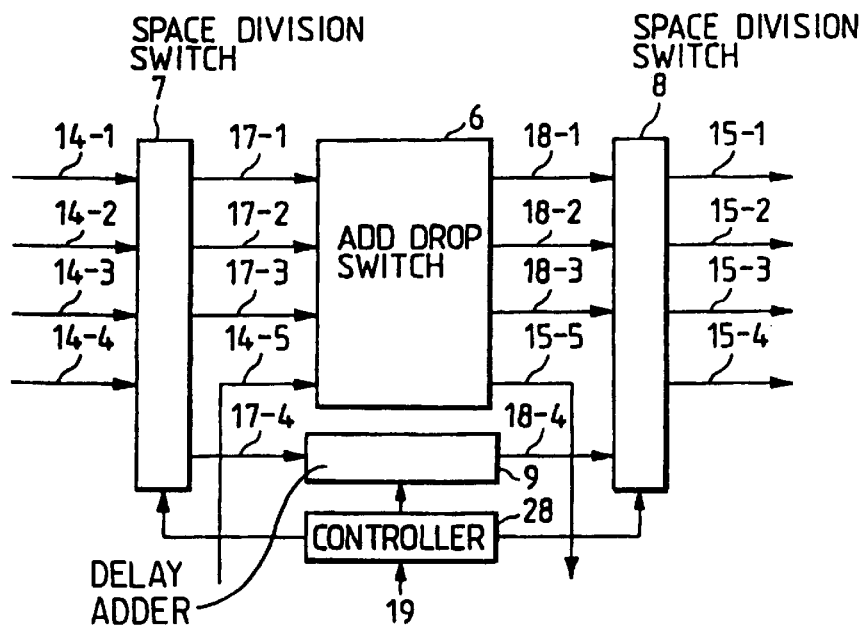
FIG. 2 is a diagram showing a construction of a switch portion in a first embodiment of the present invention.

The construction of the switch 1 is shown in FIG. 2. The circuit shown in FIG. 2 is constructed to comprise a self-healing ring switch (SHRSW) composed of a first space division switch 7, an add drop switch (i.e., time division switch) 6, a second space division switch 8, a delay adder 9 and a controller 28. The space division switches 7 and 8 have four inputs and four outputs. The add drop switch 6 has four inputs and four outputs. Moreover, the ring reception lines 20 to 23 are connected with the input terminals of the space division switch 7 through the reception interfaces. The output terminals of the space division switch 8 are connected with the ring transmission lines 24 to 27 through the transmission interfaces. The add line 11 is connected with the input terminal of the add drop switch. Reverting to FIG. 1, the output terminal (i.e., the highway a15-5) of the add drop switch 6 is connected with one input terminal of the selector 2. With the other input terminal of the selector, there is connected the output highway b'15-6 which is dropped from the output highway b15-4 of the space division switch 8.

Figure 3A:
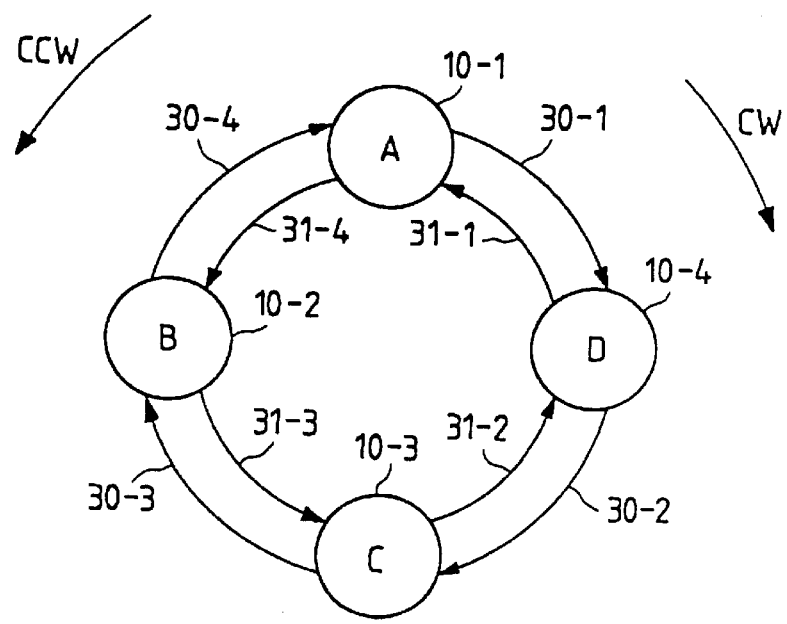
FIGS. 3A and 3B show diagrams explaining a 2-Fiber BLSR.
Figure 3B:
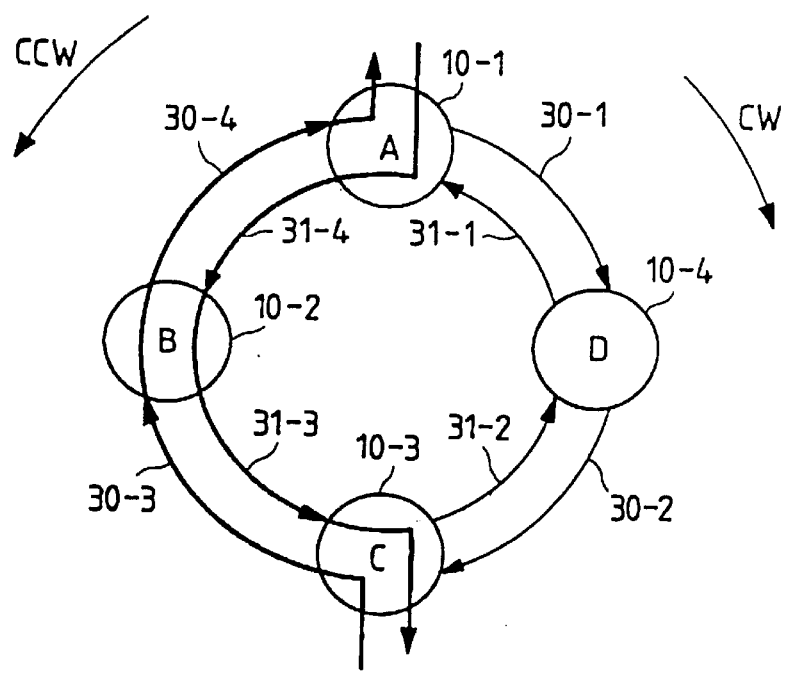
Figure 4:
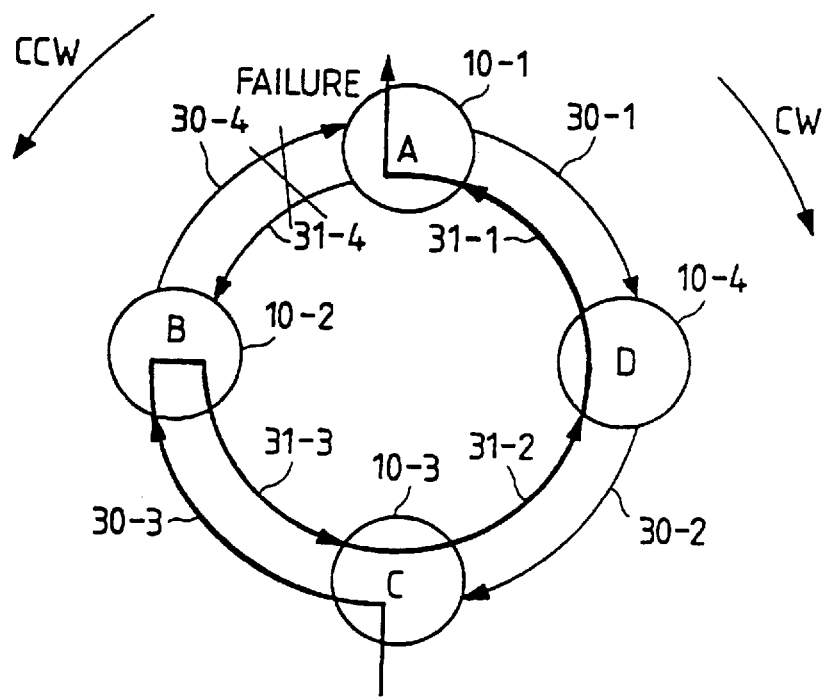
FIG. 4 is a diagram showing a healing example in the 2-Fiber BLSR.
Figure 5:
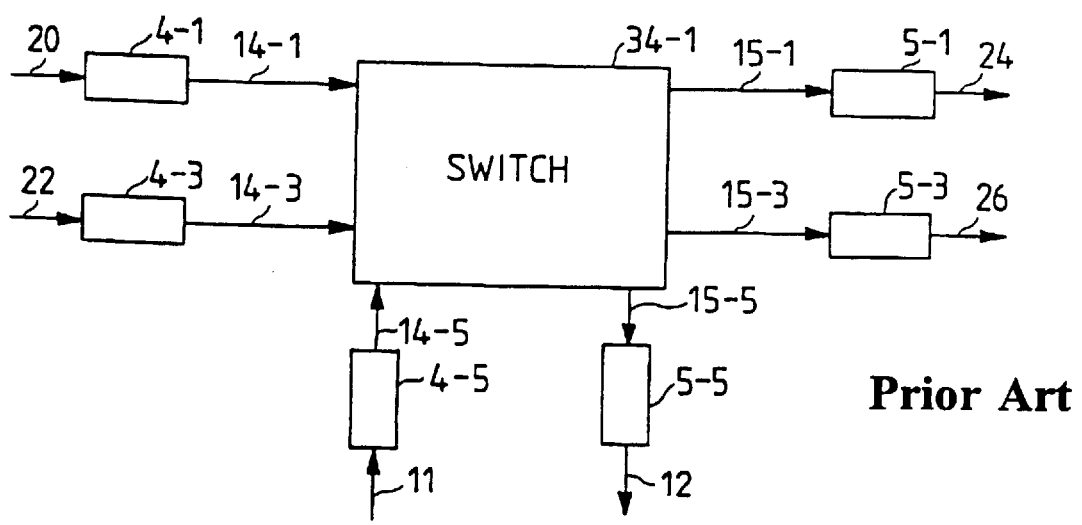
FIG. 5 is a diagram showing an example of the node construction of the 2-Fiber BLSR in the prior art.
Figure 12:
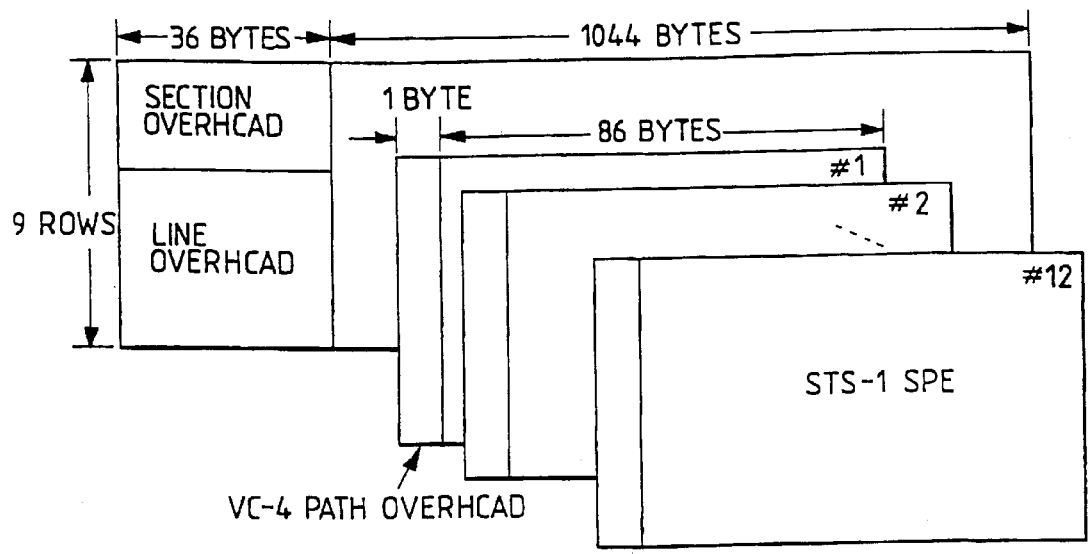
FIG. 12 is a diagram showing a frame construction in the embodiment of the present invention.
Figure 13:
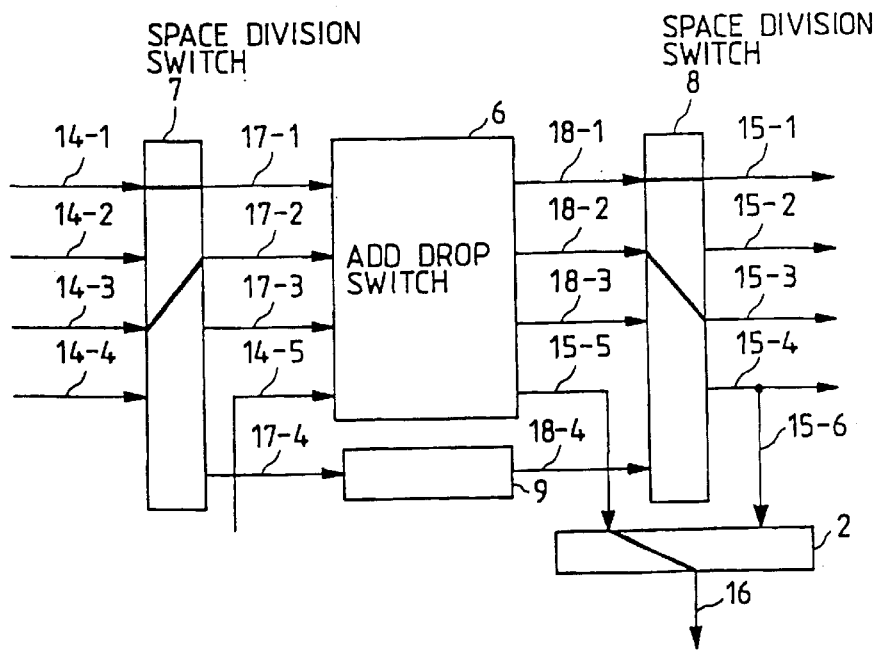
FIG. 13 is a diagram showing a setting in the 2Fiber BLSR.

Next, the frame to be used in the present embodiment is assumed to be the SONET synchronous transport signal level 12 (STS-12) (622.08 Mb/s) signal which is standardized by the ANSI, as shown in FIG. 12. The present embodiment aims at switching at a unit of STS-1. Reverting to FIG. 1, here will be described the method of using the circuits of FIGS. 1 and 2 in the 2-Fiber BLSR. No protection line is used in the 2Fiber BLSR. Therefore, the settings of the space division switches are fixed, as shown in FIG. 13. Specifically, the clockwise (i.e., CW-direction) and counter clockwise (i.e., CCW-direction) working lines are always selected so that they are connected with the add drop switch 6. At the ring-switching time, the add drop switch 6 changes the output time slot to transmit the signal of the working path through the protection capacity in the counter direction. In case the frame of FIG. 12 is used, for example, signals STS-1#1 to #6 may be used as the working ones, whereas signals STS-1#7 to #12 may be used as the protection ones. The selector 2 always selects and connects the highway a15-5 with the drop line 12. In short, the highway a15-5 is always used as the drop line. Next, the operations of the 2-Fiber BLSR in the switch having the construction of FIG. 1 will be described with reference to FIGS. 3A and 3B. In case the switch having the construction of FIG. 1 is applied to a node A of FIG. 3A: the CW-direction working reception line 20 corresponds to a line 30-4 of FIG. 3A; the CCW-direction working reception line 22 corresponds to a line 31-1 of FIG. 3A; the CW-direction working transmission line 24 corresponds to a line 30-1 of FIG. 3A; and CCW-direction working transmission line 26 corresponds to a line 31-4 of FIG. 3A. In case, on the other hand, the switch having the construction of FIG. 1 is applied to a node B of FIG. 3A: the CW-direction working reception line 20 corresponds to a line 30-3 of FIG. 3A; the CCW-direction working reception line 22 corresponds to the line 31-4 of FIG. 3A; the CW-direction working transmission line 24 corresponds to the line 30-4 of FIG. 3A; and the CCW-direction working transmission line 26 corresponds to a line 31-3 of FIG. 3A. A failure is detected, if it occurs in the lines 30-4 and 31-4 between the nodes A–B, by the aforementioned failure detecting means in the reception interfaces of the nodes A and B and is transmitted through the signal line 19 to the controller 28 in the switch. This controller 28 bypasses the traffic from the node B to the node A, as shown in FIG. 4. At the node B, the controller 28 controls the time division switch 6 so that the signal having been outputted to the working channel in the line 30-4 is outputted to the protection channel in the line 31-3. At the node A, the controller 28 controls the time division switch 6 so that the signal having been received from the working channel in the line 30-4 is received from the protection channel in the line 31-1. The ring-switching is completed (as shown in FIG. 4) by bypassing the traffic from the node A to the node B like before.

At this time, nodes C and D of FIG. 4 come into the state called the "Full Pass-through". The nodes A and B transmit the message together with said bypass signal when they bypass the traffic. The nodes C and D come into the Full Pass-through state, when they receive said message, to relay the bypassed signal. Specifically, the signal carried by the protection channel of the reception line in a certain direction (e.g., CW- or CCW-direction) is outputted to the protection channel of the transmission line in the same direction. The transmission of the aforementioned message is determined to use the 2 bytes in a line overhead (as shown in FIG. 12) in accordance with the recommendation of ANSI.

Figure 6A:
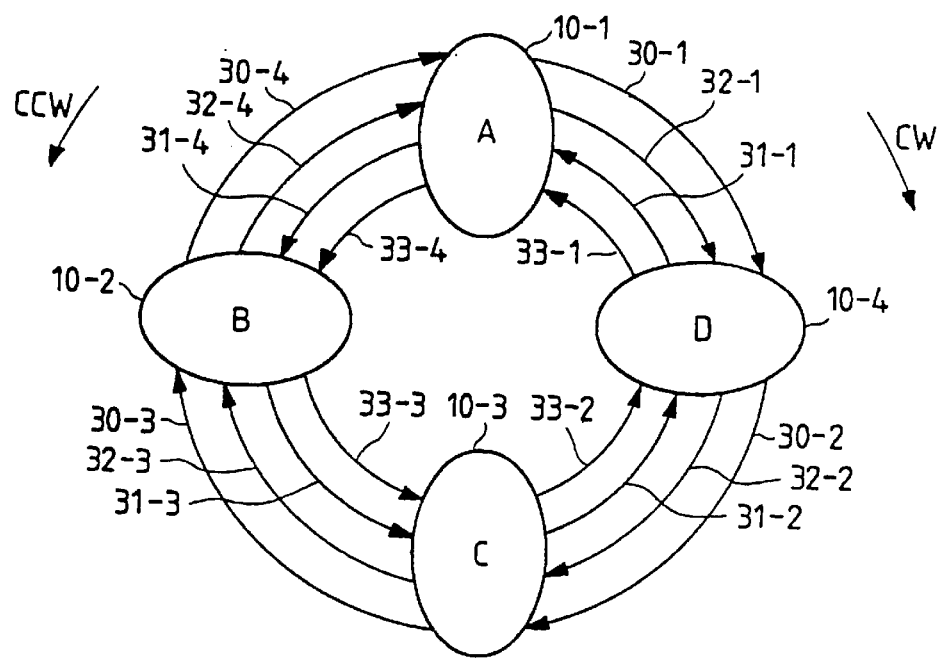
FIGS. 6A and 6B show diagrams explaining a 4-Fiber BLSR.
Figure 6B:
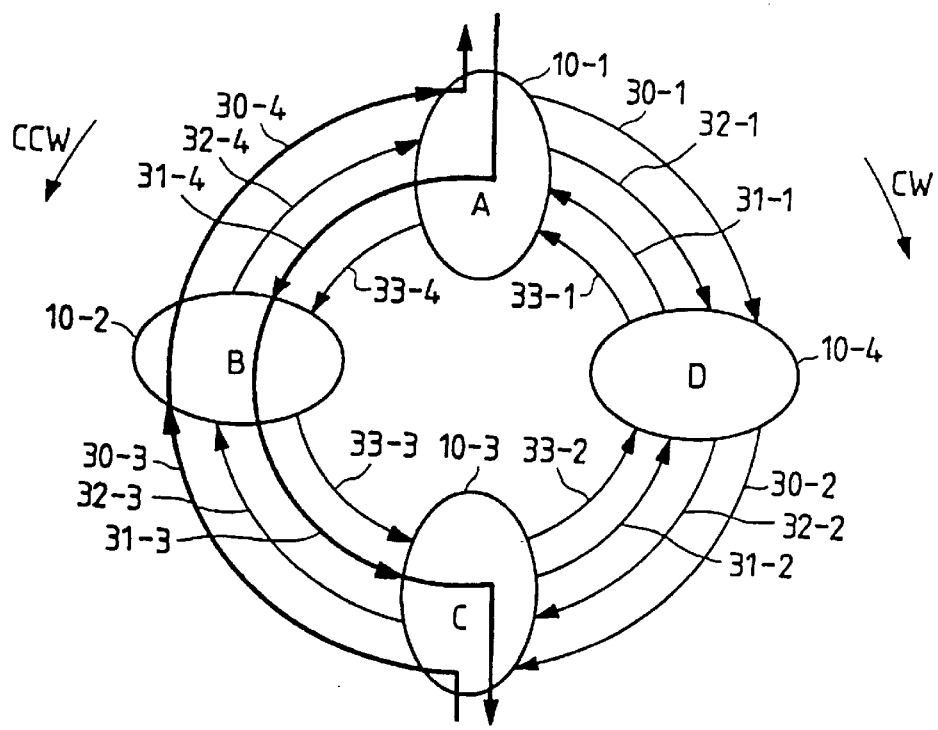

Here will be described the case in which the switch shown in FIG. 1 is applied to the 4-Fiber BLSR. In case the switch of FIG. 1 is applied to the node A of FIG. 6A: the CW-direction working reception line 20 corresponds to the line 30-4 of FIG. 6A; the CW-direction protection reception line 21 corresponds to a line 32-4 of FIG. 6A; the CCW-direction working reception line 22 corresponds to the line 31-1 of FIG. 6A; the CCW-direction protection transmission line 23 corresponds to a line 33-1 of FIG. 6A; the CW-direction working transmission line 24 corresponds to the line 30-1 of FIG. 6A; the CW-direction protection transmission line 25 corresponds to a line 32-1 of FIG. 6A; the CCW-direction working transmission line 26 corresponds to the line 31-4 of FIG. 6A; and the CCW-direction protection transmission line 27 corresponds to a line 33-4 of FIG. 6A. In the case of application to the node B: the CW-direction working reception line 20 corresponds to the line 30-3 of FIG. 6A; the CW- direction protection reception line 21 corresponds to the line 32-3 of FIG. 6A; CCW-direction working reception line 22 corresponds to the line 31-4 of FIG. 6A; the CCW-direction protection reception line 23 corresponds to the line 33-4 of FIG. 6A; the CW-direction working transmission line 24 corresponds to the line 30-4 of FIG. 6A; the CW-direction protection transmission line 25 corresponds to the line 32-4 of FIG. 6A; the CCW-direction working transmission line 26 corresponds to a line 31-3 of FIG. 6A; and the CCW-direction protection transmission line 27 corresponds to the line 33-3 of FIG. 6A.

Figure 14:
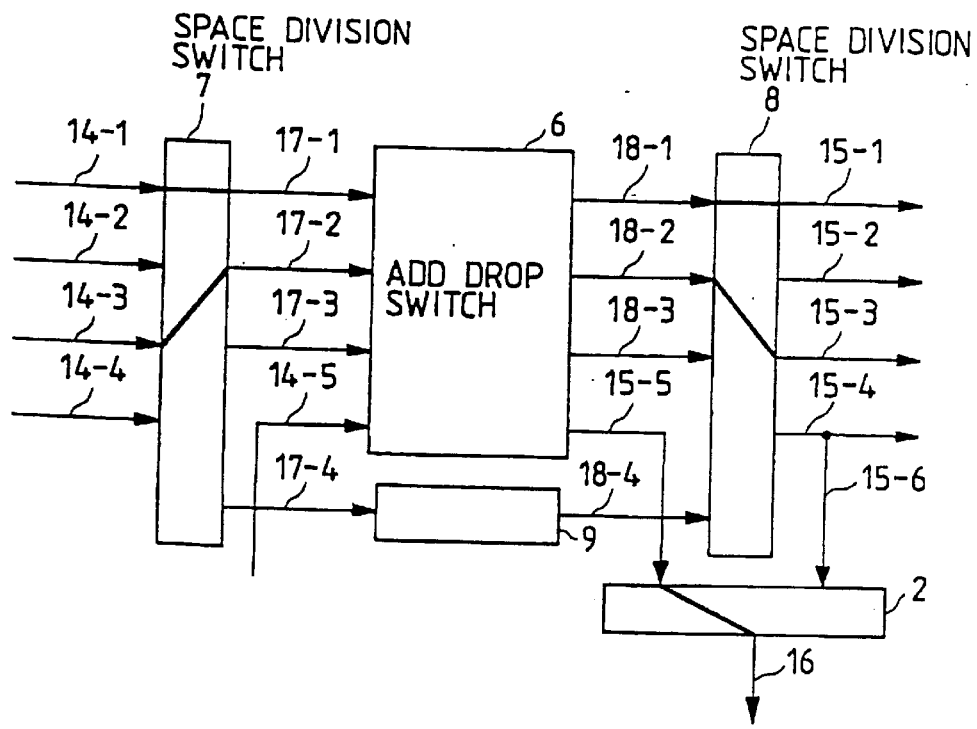
FIG. 14 is a diagram showing a setting in the 4-Fiber BLSR.

In case the switch is used in the 4-Fiber BLSR, the operations of the time division switch 6 at the ring-switching time and the span-switching time are fixed. At the normal time, the space division switches 7 and 8 connect the working lines and the time division switch 6, as shown in FIG. 14.

Figure 7A:
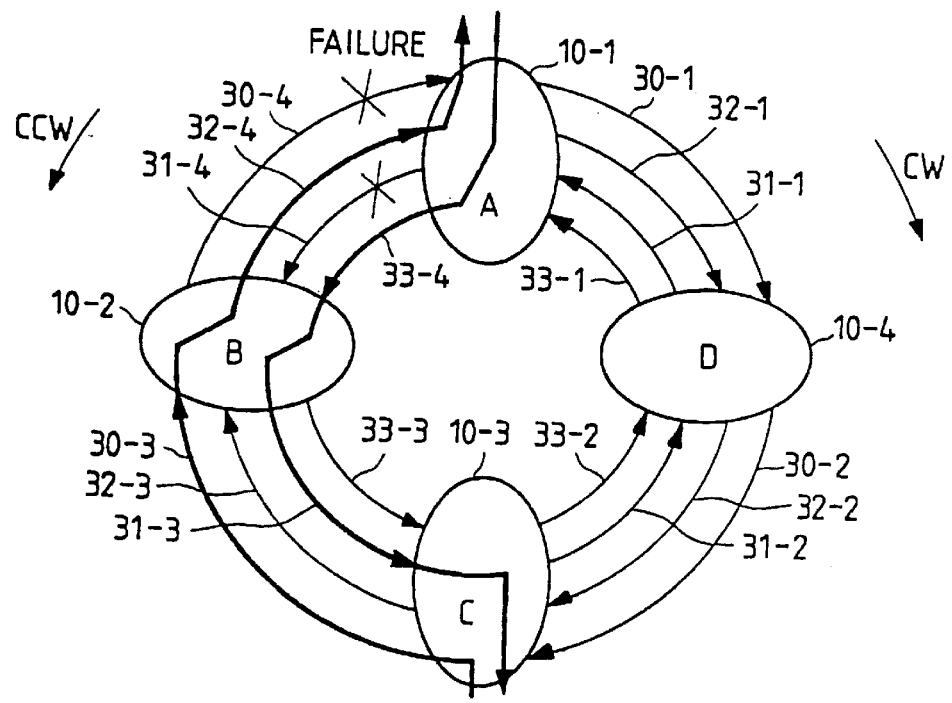
FIGS. 7A and 7B show diagrams showing a healing example in the 4-Fiber BLSR.
Figure 7B:
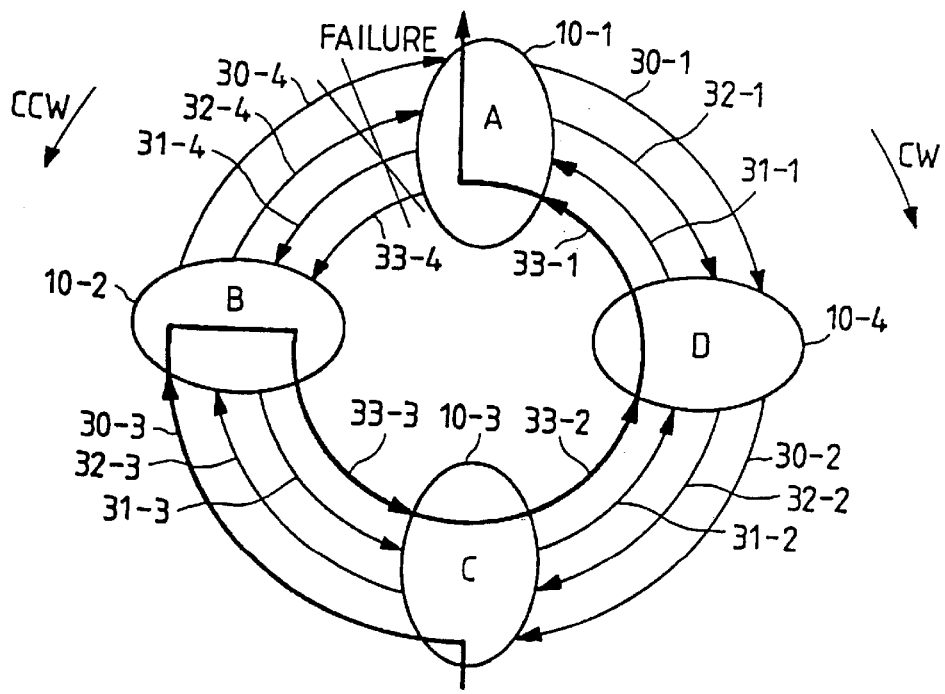
Figure 8:
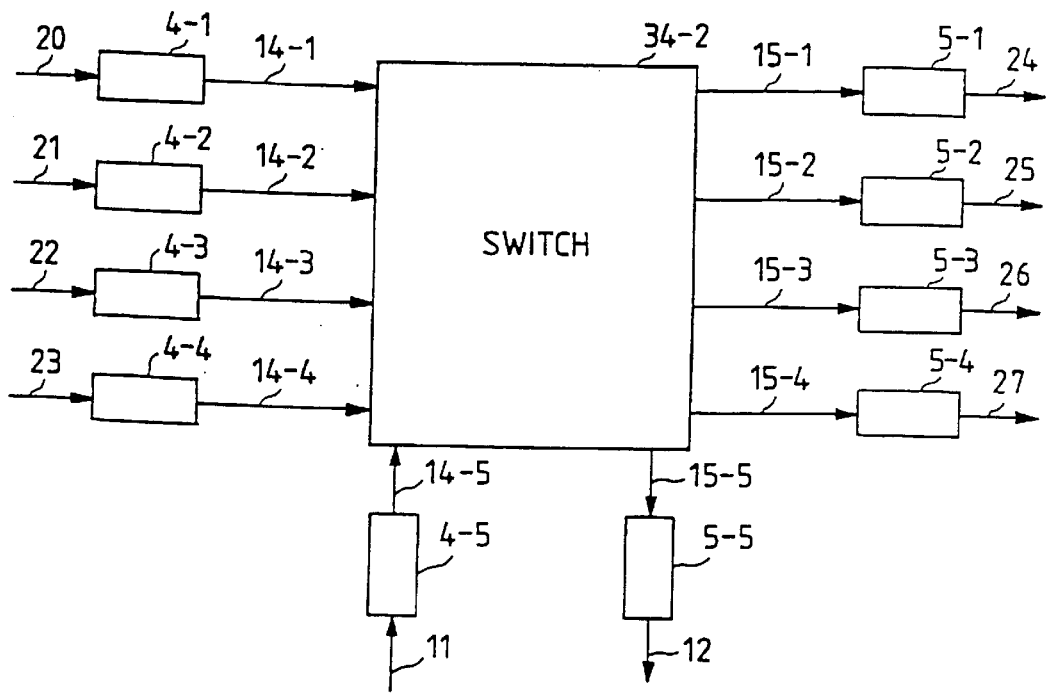
FIG. 8 is a diagram showing an example of the node construction of the 4-Fiber BLSR in the prior art.
Figure 9A:
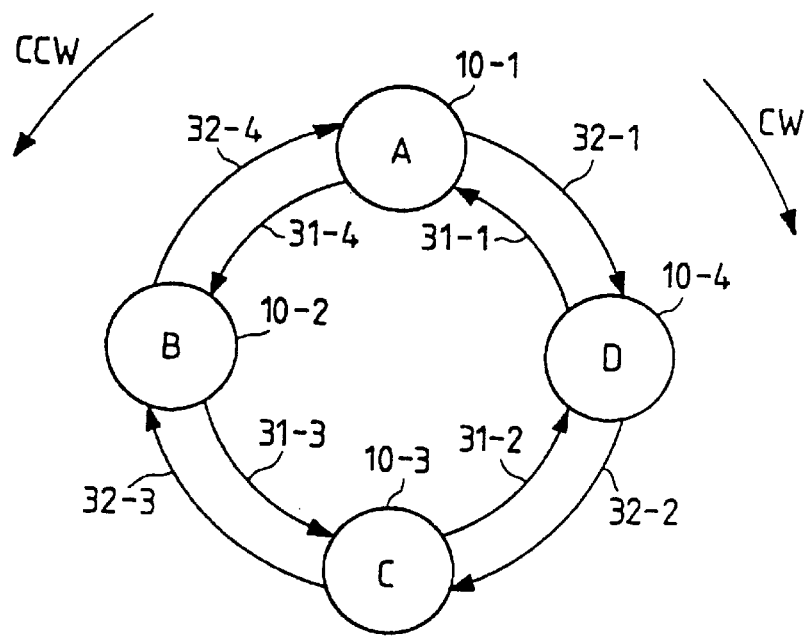
FIGS. 9A and 9B show diagrams explaining a UPSR.
Figure 9B:
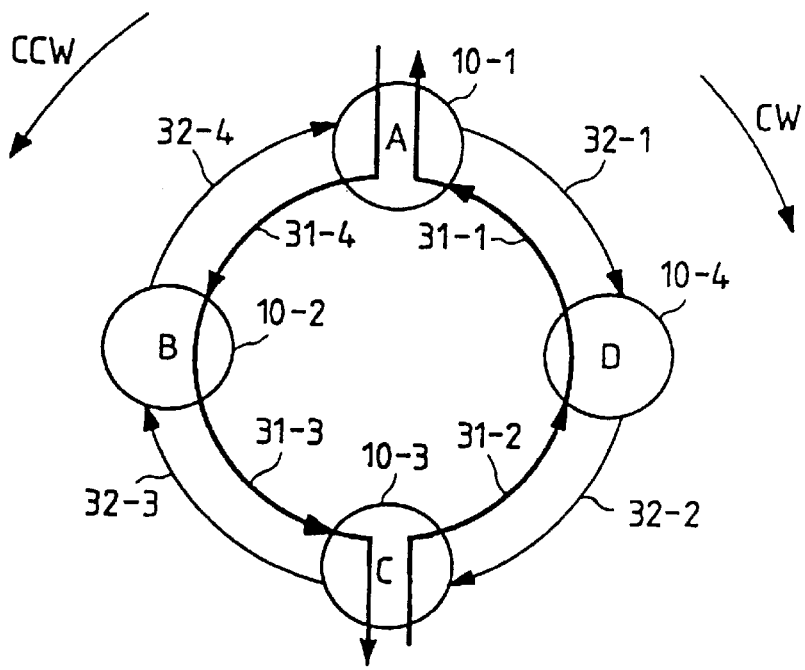
Figure 10:
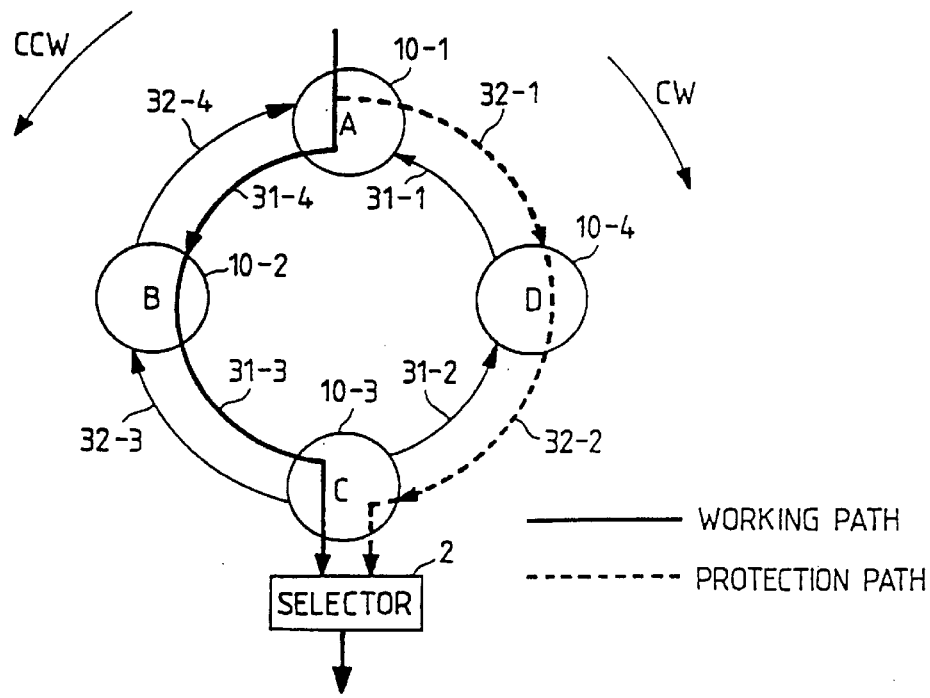
FIG. 10 shows a diagram showing a healing example in the UPSR.
Figure 11:
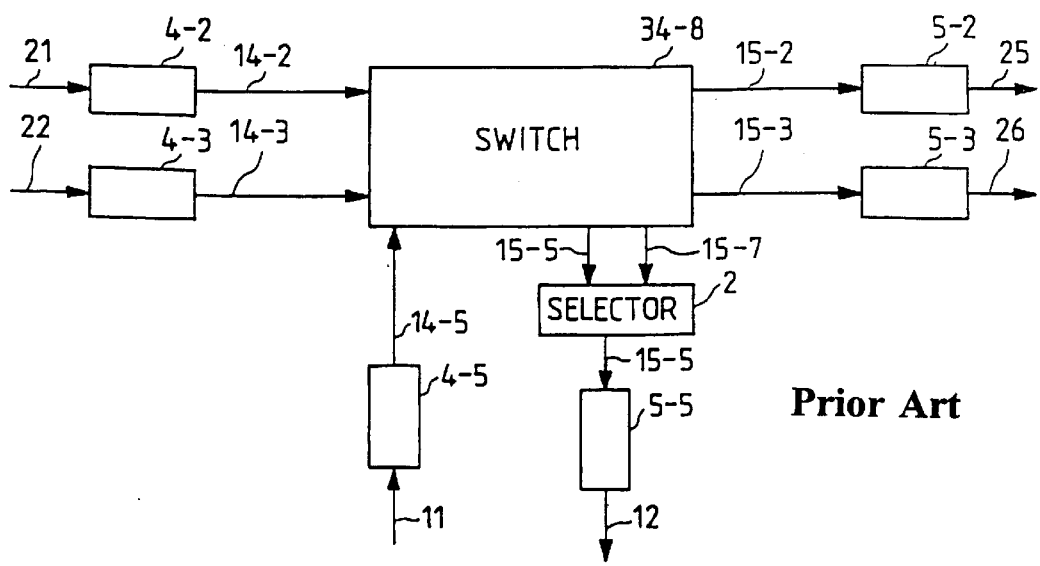
FIG. 11 is a diagram showing an example of the node construction of the UPSR in the prior art.
Figure 15:
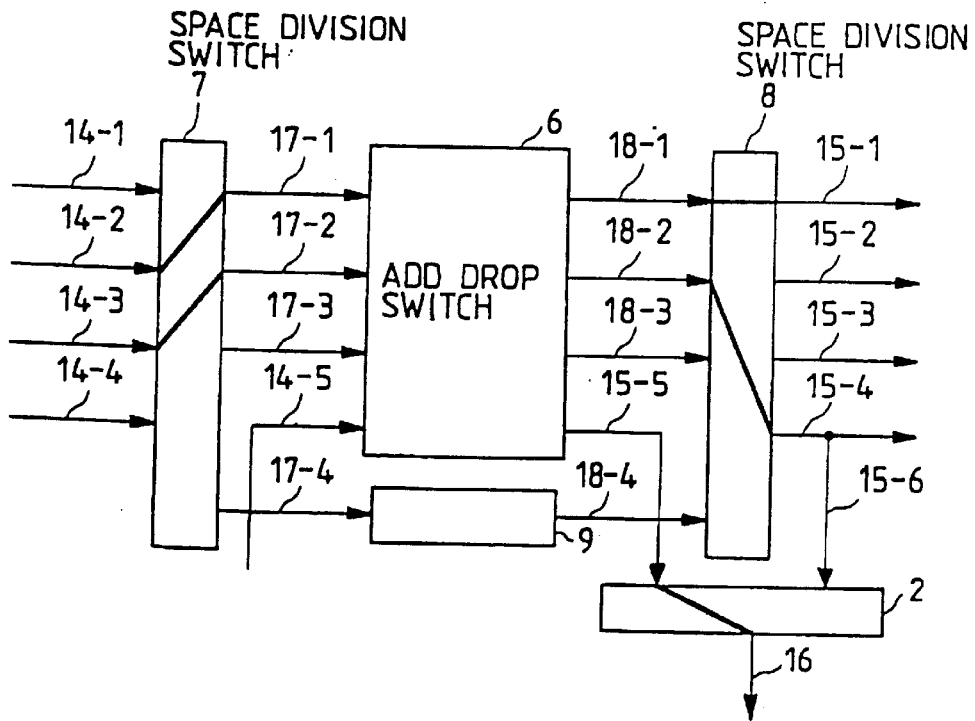
FIG. 15 is a diagram showing a span-switching in the 4-Fiber BLSR.
Figure 16A:
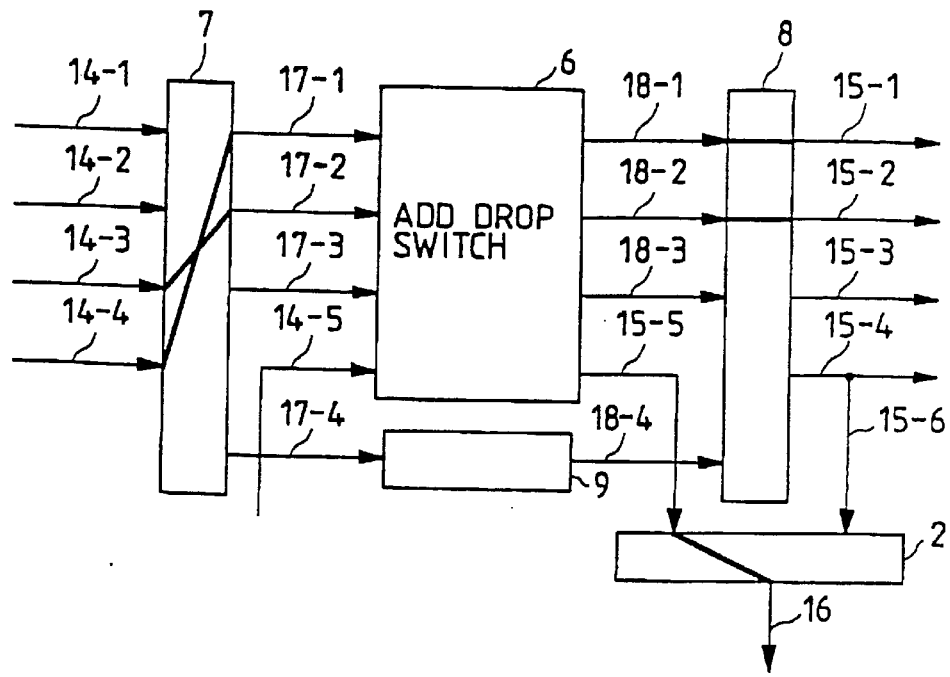
FIGS. 16A and 16B are diagrams showing a ring-switching in the 4-Fiber BLSR.

First of all, in case a failure occurs in the working lines 30-4 and 31-4 between the nodes A and B, as shown in FIG. 7A, the span-switching is applied. In this case, at the node A, the reception interface detects the occurrence of the failure, which is transmitted to the controller 28 through the signal line 19. The controller 28 controls the space division switch 7 to connect the signal to be received from the protection line 32-4 in place of the working line 30-4 with the time division switch 6. By controlling the space division switch 8, moreover, the signal having been outputted to the working line 31-4 before the failure occurs is outputted to the protection line 33-4 (as shown in FIG. 15). The span-switching is completed by performing similar operations at the node B. Next, in case a failure occurs in the working lines 30-4 and 31-4 and the protection lines 32-4 and 33-4 between the nodes A and B, as shown in FIG. 7B, the ring-switching is applied. In this case, at the node A, the reception interface detects the occurrence of the failure, which is transmitted to the controller 28 through the signal line 19. This controller 28 detects that the failure has occurred in both the working and protection lines. The controller 28 controls the space division switch 7 to connect the signal to be received from the protection line 33-1 in place of the working line 30-4 with the time division switch 6 (as shown in FIG. 16A). By controlling the space division switch 8, moreover, the signal having been outputted to the working line 31-4 before the failure occurs is outputted to the protection line 32-1. The span-switching is completed by performing similar operations at the node B.

Figure 16B:
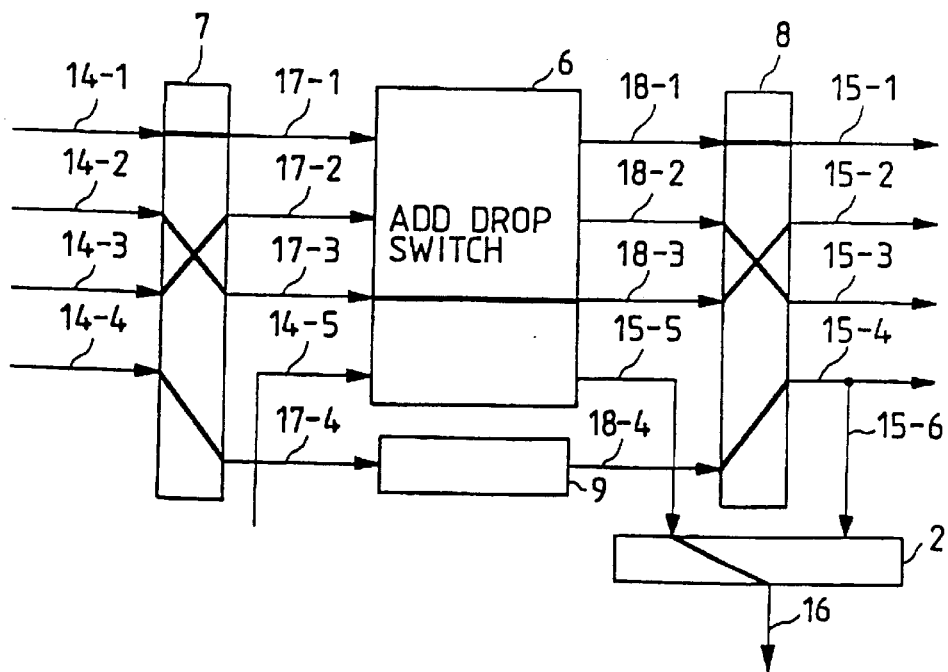

At this time, the nodes C and D of FIG. 7B come into the state called the "Full Pass-through". The nodes A and B transmit the message together with said bypass signal when they bypass the traffic. The nodes C and D come into the Full Pass-through stage, when they receive said message, to relay the bypassed signal. Specifically, the signal carried by the protection reception line in a certain direction (e.g., CW- or CCW-direction) is outputted to the protection transmission line in the same direction. The transmission of the aforementioned message is determined to use the 2 bytes in a line overhead (as shown in FIG. 12) in accordance with the recommendation of ANSI. The node setting at the time of executing the Full Pass-through is shown in FIG. 16B. In short, the settings of the space division switches 7 and 8 for the working lines are not changed. Moreover, the CW-direction protection transmission line 21 is connected with the CW-direction protection transmission line 25. Furthermore, the CCW-direction protection reception line 23 is connected with the CCW-direction protection transmission line 27 through the delay element 9. This delay element 9 makes the frame phase of the traffic to pass therethrough to that of the traffic to pass through the time division switch.

The selector 2 selects the highway a15-5 at all times and connects it with the drop line 12. In short, the highway a15-5 is always used as the drop line.

Figure 17:
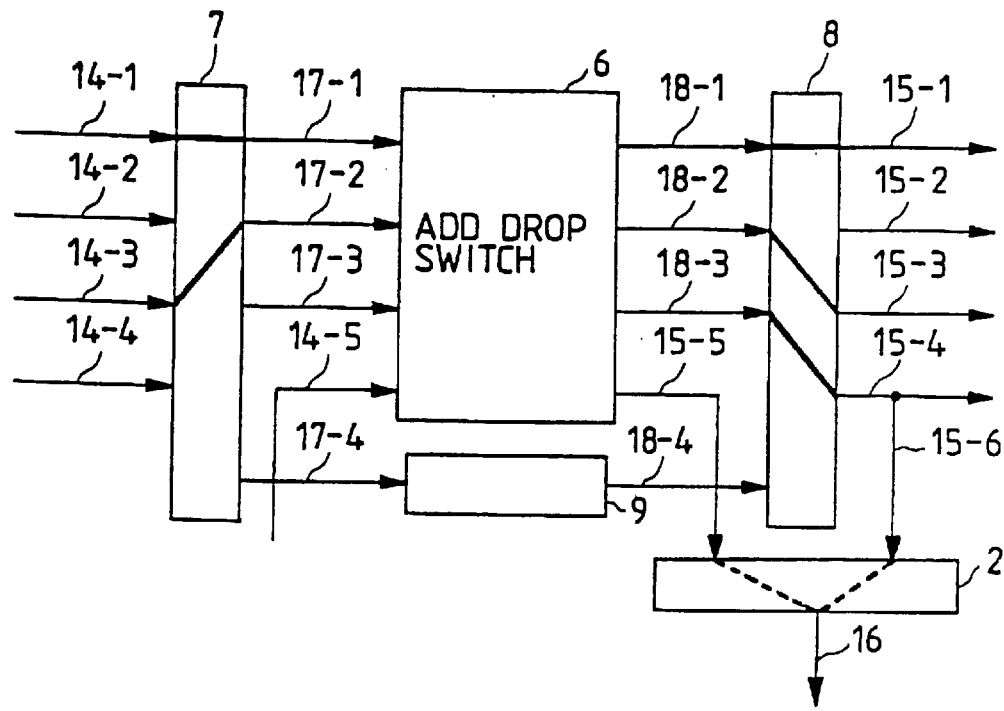
FIG. 17 is a diagram showing a setting in the UPSR.
Figure 18:
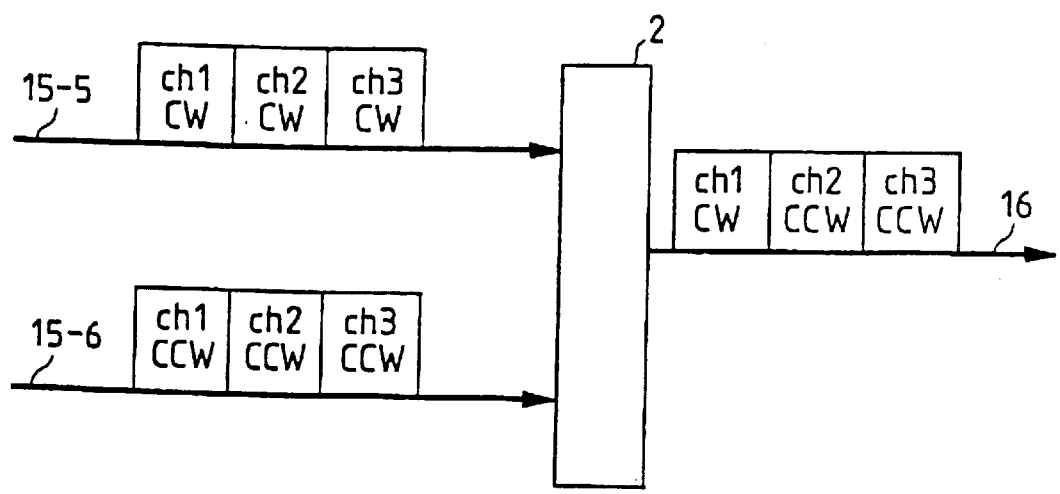
FIG. 18 is a diagram showing a healing method in the UPSR.

Here will be described the method in which the SHRSW is used in the UPSR, with reference to FIG. 17. In the case of using the SHRSW in the UPSR, only two lines are used for connecting the nodes. In case, therefore, the CCW-direction is used for the working ones whereas the CW-direction is used for the protection ones, it is possible to dispense with the CCW-direction protection lines 23 and 27 and the interfaces 4-4 and 5-4, as shown in FIG. 1. Thus, the settings of the space division switches 7 and 8 are fixed as shown in FIG. 17. Then, the add drop switch 6 outputs both those signals of the paths to be dropped by said nodes, which have passed through the CW-direction and CCW-direction lines, respectively, to the output highways 15-4 and 15-5 (as shown in FIG. 18). The selector is enabled to heal the failure by selecting the normal one of the two signals. FIG. 18 indicates that the channel 1 (ch1) selects the CW-direction line because the CCW-direction path of the channel 1 has failed. At this time, the selector controller 3 controls the selector by using the signal line 19 from the reception interfaces. Here, the channel indicates the VT 1.5 in the case of switching at the unit of VT 1.5, for example.

The reception interfaces use the signal line 19 to transmit the failure information (for both the working and protection) of all the channels to be dropped at said node, to the selector controller 3. This selector controller 3 instructs the selector of which the working or protection line is to be selected and outputted for each channel. For example, the selector controller 3 instructs the selection of the working line at a normal time and the selection of the protection line if it is transmitted from the signal line 19 that said working line is failured. This instruction is executed at the unit of the channel to be multiplexly outputted to highways 15-1 and 15-6.

In case a plurality of channels are doubly set in the UPSR, as in the present embodiment, the operation to select one of the signals in the working path and the signal in the protection path in the selector can be facilitated if the signals of the working paths of said plurality of channels are outputted to an output highway 15-5 by the TSI function of the time division switch 6. If, moreover, the switch outputs the signals of the working and protection paths of the same channel simultaneously to the highways 15-5 and 15-6, as in the present embodiment, the selector has its construction facilitated because it requires no buffer.

Next, the linear switch (1+1, 1:n) mode can be easily coped with if the space division switches 7 and 8 are used. In the case of the (1+1) mode, the space division switch 8 has a function to output (or distribute) the output of the add drop switch 6 to both the working and protection lines.

The add drop switch 6 in the aforementioned embodiment can also be exemplified by a time division switch.

The switch 1 in the aforementioned embodiment can also be exemplified by a time division switch.

The delay adder in the aforementioned embodiment can also be exemplified by a semiconductor memory.

Figure 19:
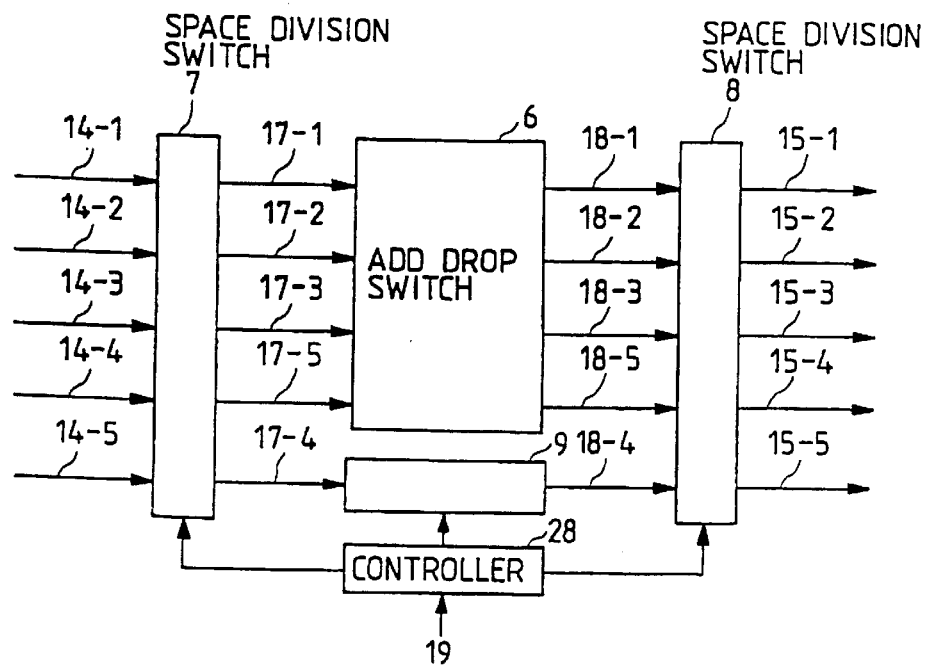
FIG. 19 is a diagram showing a second constructing method of a switch 1.

Moreover, the switch in the aforementioned embodiment can also be exemplified by the following construction (as shown in FIG. 19). Specifically, in the self-healing ring switch (SHRSW) composed of the first space division switch 7, the add drop switch 6, the second space division 8, the delay adder 9 and the controller 28, the space division switches 7 and 8 are given five inputs and five outputs, and the add drop switch 6 is given four inputs and four outputs. Moreover, the ring reception lines 20 to 23 and the add line 11 are connected with the input terminals of the space division switch 7 through the reception interfaces. The output terminals of the space division switch 8 are connected with the ring transmission lines 24 to 27 through the transmission interfaces. What is different from the foregoing embodiment is that a highway 14-5 is connected through the space division switch 7 with the add drop switch 6 and that the highway 15-5 is connected through the space division switch 8, and this construction can be easily realized.

Figure 20:
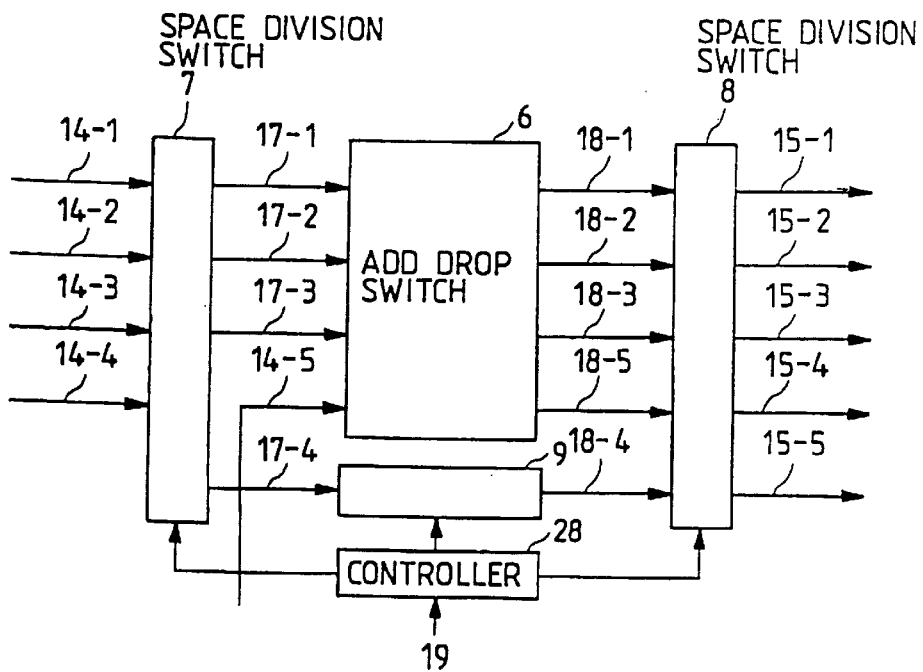
FIG. 20 is a diagram showing a third constructing method of a switch 1.

Moreover, the switch in the aforementioned embodiment can also be exemplified by the following construction (as shown in FIG. 20). Specifically, in the self-healing ring switch (SHRSW) composed of the first space division switch 7, the add drop switch 6, the second space division 8, the delay adder 9 and the controller 28, the space division switches 7 and 8 are given five inputs and five outputs, and the add drop switch 6 is given four inputs and four outputs. The output terminals of the space division switch 8 are connected with the ring transmission lines 24 to 27 through the transmission interfaces. What is different from the foregoing embodiments is that the highway 15-5 is connected through the space division switch 8, and this construction can be easily realized.

Figure 21:
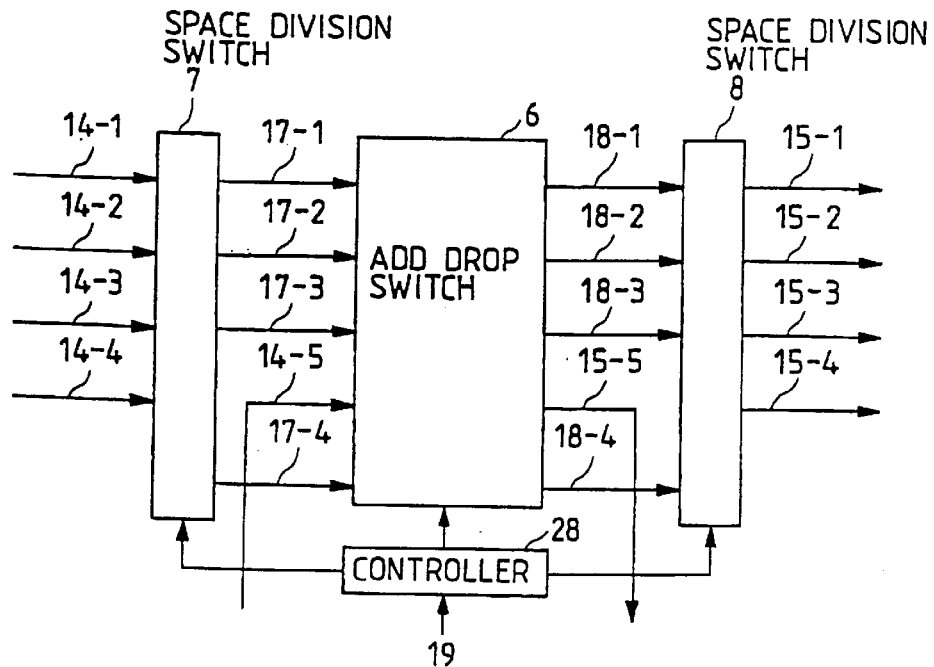
FIG. 21 is a diagram showing a fourth constructing method of a switch 1.

Moreover, the switch 1 in the aforementioned embodiment can also be exemplified by the following construction (as shown in FIG. 21). Specifically, in the self-healing ring switch (SHRSW) composed of the first space division switch 7, the add drop switch 6, the second space division 8, the delay adder 9 and the controller 28, the add drop switch 6 is given five inputs and five outputs. Moreover, the ring reception lines 20 to 23 are connected with the input terminals of the space division switch 7 through the reception interfaces. The output terminals of the space division switch 8 are connected with the ring transmission lines 24 to 27 through the transmission interfaces. What is different from the foregoing embodiments is that the scale of the add drop switch 6 is enlarged to omit the delay adder 9, and this construction can be easily realized.

Figure 22:
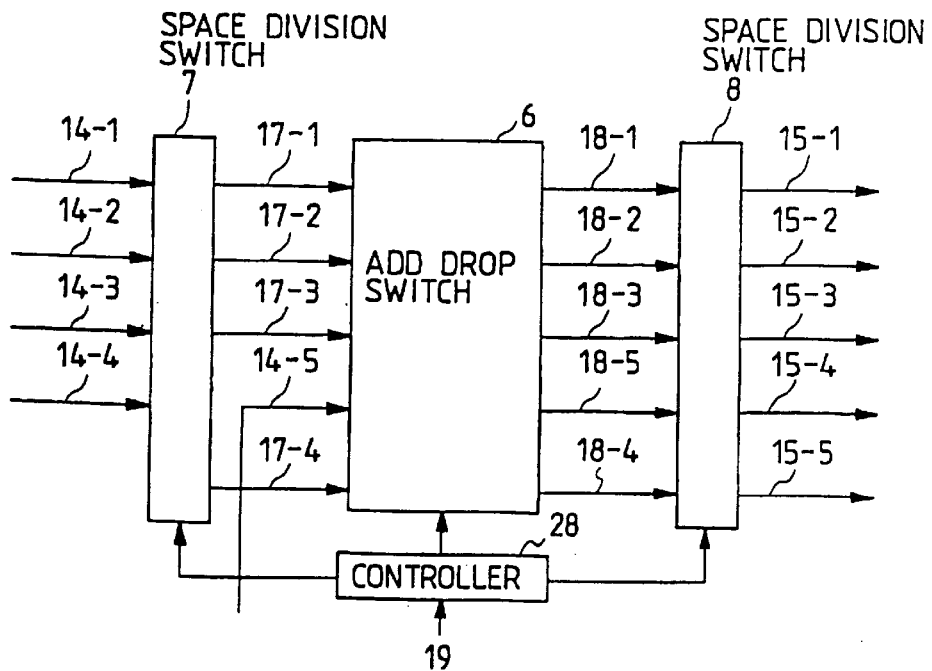
FIG. 22 is a diagram showing a fifth constructing method of a switch 1.

Moreover, the switch in the aforementioned embodiment can also be exemplified by the following construction (as shown in FIG. 22). Specifically, in the self-healing ring switch (SHRSW) composed of the first space division switch 7, the add drop switch 6, the second space division 8, the delay adder 9 and the controller 28, the space division switch 8 is given five inputs and five outputs, and the add drop switch 6 is given five inputs and five outputs. Moreover, the ring reception lines 20 to 23 are connected with the input terminals of the space division switch 7 through the reception interfaces. The output terminals of the space division switch 8 are connected with the ring transmission lines 24 to 27 through the transmission interfaces. What is different from the foregoing embodiments is that the highway 15-5 is connected through the space division switch 8 and that the scale of the add drop switch 6 is enlarged to omit the delay adder 9, and this construction can be easily realized.

The various ring-switching modes of the 2-Fiber BLSR, 4-Fiber BLSR and UPSR can be switched merely by changing the software. Moreover, the change from the ring-switching system to the linear switching system and vice versa can be effected.

What is claimed is:

1. A self-healing ring network comprising:
    a self-healing ring switch having a plurality of input/output highways; and
    a selector having a plurality of input terminals and an output terminal,
    wherein a first of the output highways (output highway a) of said self-healing ring switch for reducing a number of highway outputs, wherein said self-healing ring switch is connected with one of the input terminals of said selector, wherein at least a second of the output highways (output highway b) of said self-healing ring switch is branched, wherein one of the highways which is branched (output highway b') is connected with another input terminal of said selector, and wherein the output terminal of said selector is connected with a drop line.

2. The self-healing ring network according to claim 1,
    wherein said self-healing ring switch includes a first space division switch, an add drop switch, and a second space division switch,
    wherein said first space division switch has at least four input and four output terminals,
    wherein said add drop switch has at least five input and five output terminals,
    wherein said second space division switch has at least four input and four output terminals,
    wherein four of the output terminals of said add drop switch are connected with the input terminals of said second space division switch,
    wherein signals from an add line are fed to one of the input terminals of said add drop switch, and
    wherein that output terminal of said add drop switch which is not connected with said second space division switch is used as said first output highway a, whereas one of the output highways of said second space division switch is used as said second output highway b.

3. The self-healing ring network according to claim 1,
    wherein said self-healing ring switch includes a first space division switch, an add drop switch, and a second space division switch,
    wherein said first space division switch has at least four input and four output terminals,
    wherein said add drop switch has at least five input and five output terminals,
    wherein said second space division switch has at least five input and five output terminals,
    wherein four of the output terminals of said first space division switch are connected with the input terminals of said add drop switch,
    wherein five of the output terminals of said add drop switch are connected with the input terminals of said second space division switch,
    wherein signals from an add line are fed to one of the input terminals of said add drop switch, and
    wherein one of the output highways of said second space division switch is used as said first output highway a, whereas another of the output highways of said second space division switch is used as said second output highway b.

4. The self-healing ring network according to claim 1, wherein when said self-healing ring switch is used in the Unidirectional Path Switched Ring (UPSR) specified in the ANSI, the signal to be outputted from a node to a drop line is determined at a unit of path as to which of the output highways a and b the signal of the clockwise path or the signal of the counter-clockwise path is outputted to, so that said selector selects one of the output highways a and b' at the path unit.

5. The self-healing ring network according to claim 1, wherein when said self-healing ring switch is used in the Unidirectional Path Switched Ring (UPSR) specified in the ANSI, the signal to be outputted from a node to a drop line is determined at a unit of path as to which of the output highways a and b the signal of the clockwise path or the signal of the counter-clockwise path, while one being for the working, whereas the other being for the protection, is outputted to, so that said selector selects one of the output highways a and b' at the path unit.

6. The self-healing ring network according to claim 1, wherein when said self-healing ring switch is used in a switching system other than the UPSR, said selector selects the output highway a at all times.

7. The self-healing ring network according to claim 1, wherein when said self-healing ring switch is used in either the 1+1 linear protection switching system or 1:N linear protection switching system, said selector selects the output highway a at all times.

8. A processing method to be used for each of the nodes in a self-healing ring network that includes:
    a self-healing ring switch having a plurality of input ports and a plurality of output ports; and
    a selector having at least two input ports and one output port, two of the output ports of said self-healing ring switch being connected with the input ports of said selector,
    wherein the communications between the nodes in said self-healing ring network are realized such that the nodes at the transmission side send out a transmission signal to both a clockwise line and a counter-clockwise line in said self-healing ring network, whereas the nodes at the reception side select one of the signals having arrived through said two paths, said method comprising:
    a switch control method comprising the steps of:
    connecting at a reception node the signal having passed through said clockwise line and the signal having passed through said counter-clockwise line with the input ports of said self-healing ring switch in said node,
    outputting at said self-healing ring switch in said node the signals having passed through said clockwise line in a time-division-multiplexed form to the other output port, outputting the signals having passed through said clockwise line and said counter-clockwise line belonging to a common channel, simultaneously to said two output ports, and selecting one of the signals to arrive from the two output ports of said self-healing ring switch.

9. A processing method to be used for each of the nodes in a self-healing ring network that includes:

a self-healing ring switch having a plurality of input ports and a plurality of output ports; and a selector having at least two input ports and one output port, two of the output ports of said self-healing ring switch being connected with the input ports of said selector, wherein the communications between the arbitrary two nodes in said self-healing ring network are realized such that the nodes at the transmission side send out a transmission signal to both a clockwise line and a counter-clockwise line in said self-healing ring network while setting one of the signals having passed through said clockwise line and said counter-clockwise line to the working one, but the other to the protection one, whereas the nodes at the reception side select one of the working and protection signals, said method comprising:

a switch control method comprising the steps of;

connecting at a reception node the received signals with the input ports of said self-healing ring switch in said node, outputting at said self-healing ring switch in said node the working signals in a time-division-multiplexed form to one of the output ports of said self-healing ring switch, which are connected with said selector, and the protection signals in a time-division-multiplexed form to the other output port, outputting at said self-healing ring switch said working and protection signals belonging to a common channel, simultaneously to said two output ports, and selecting one of the signals to arrive from the two output ports of said self-healing ring switch.

\* \* \* \* \*

UNITED STATES PATENT AND TRADEMARK OFFICE
CERTIFICATE OF CORRECTION

PATENT NO. : 5,815,489
DATED : 29 September 1998
INVENTOR(S) : Masahiro TAKATORI et al.

It is certified that error appears in the above-indentified patent and that said Letters Patent is hereby corrected as shown below:

| Column | Line | |
|---|---|---|
| 1 | 32 | After "inter-node" insert --connecting lines--. |
| 1 | 55 | After "A-B" delete ","; after "fail" insert --,--. |
| 2 | 1 | Change "CC direction" to --CCW-direction--. |
| 3 | 31 | Change "path whereas" to --path, whereas--. |
| 4 | 9 | Change "2Fiber" to --2-Fiber--. |
| 4 | 46 | Change "selector" to --selector 2--. |
| 5 | 1 | Change "selector" to --selector 2--. |
| 5 | 12 | Change "2Fiber" to --2-Fiber--. |
| 5 | 21 | Change "STS-1#1" to --STS-1 #1--. |
| 5 | 22 | Change "STS-1#7" to --STS-1 #7--. |
| 5 | 47 | Change "switch" to --switch 1--. |
| 7 | 40 | Change "selector" to --selector 2--. |
| 7 | 51 | Change "selector" to --selector 2--. (2nd occurrence) |

UNITED STATES PATENT AND TRADEMARK OFFICE
CERTIFICATE OF CORRECTION

PATENT NO. : 5,815,489
DATED : 29 September 1998
INVENTOR(S) : Masahiro TAKATORI et al.

It is certified that error appears in the above-indentified patent and that said Letters Patent is hereby corrected as shown below:

| Column | Line  |                                                                                                                              |
|--------|-------|------------------------------------------------------------------------------------------------------------------------------|
| 7      | 56-57 | Change "is failured" to --has failed--.                                                                                      |
| 7      | 63    | Change "selector" to --selector 2--.                                                                                         |
| 8      | 2     | Change "selector" to --selector 2--.                                                                                         |
| 8      | 16    | Change "switch" to --switch 1--.                                                                                             |
| 8      | 34    | Change "switch" to --switch 1--.                                                                                             |
| 8      | 63    | Change "switch" to --switch 1--.                                                                                             |
| 9      | 21    | After "ring switch" insert --for reducing a number of highway outputs, wherein said self-healing ring switch --.             |

UNITED STATES PATENT AND TRADEMARK OFFICE
CERTIFICATE OF CORRECTION

PATENT NO. : 5,815,489

DATED : 29 September 1998

INVENTOR(S) : Masahiro TAKATORI et al.

It is certified that error appears in the above-indentified patent and that said Letters Patent is hereby corrected as shown below:

| | | |
|---|---|---|
| 9 | 26 | Delete "for reducing a number". |
| 9 | 27 | Delete entire line. |
| 9 | 28 | Delete "switch". |

Signed and Sealed this

Sixteenth Day of November, 1999

Attest:

Attesting Officer

Q. TODD DICKINSON

Acting Commissioner of Patents and Trademarks